(12) United States Patent
Crettenand et al.

(10) Patent No.: US 12,057,961 B2
(45) Date of Patent: Aug. 6, 2024

(54) OPERATING-SYSTEM-LEVEL PERMISSION MANAGEMENT FOR MULTI-ECOSYSTEM SMART-HOME DEVICES

(71) Applicant: Google LLC, Mountain View, CA (US)

(72) Inventors: Alexander Crettenand, San Mateo, CA (US); Gilles Drieu, San Francisco, CA (US); Nathan Sandland, Mountain View, CA (US); Kevin Po, San Francisco, CA (US); Alexei Sakhartchouk, Waterloo (CA); Julius Löwe, Hamburg (DE); Anna Maria Phan, Redwood City, CA (US); Mehdi Kash Khaleghi, San Jose, CA (US); Kevin Coppock, Huntsville, AL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/839,463

(22) Filed: Jun. 13, 2022

(65) Prior Publication Data
US 2023/0119043 A1    Apr. 20, 2023

Related U.S. Application Data

(60) Provisional application No. 63/270,042, filed on Oct. 20, 2021.

(51) Int. Cl.
*H04L 12/28*    (2006.01)

(52) U.S. Cl.
CPC ...... *H04L 12/2827* (2013.01); *H04L 12/2814* (2013.01); *H04L 12/282* (2013.01); *H04L 2012/285* (2013.01)

(58) Field of Classification Search
CPC ............. H04L 12/2827; H04L 12/2814; H04L 12/282; H04L 2012/285; H04L 12/2809
See application file for complete search history.

(56) References Cited

U.S. PATENT DOCUMENTS 10,917,259 B1 *   2/2021  Chein ............... H04L 12/282
2018/0330589 A1 * 11/2018  Horling ............. H05B 47/125
(Continued)

FOREIGN PATENT DOCUMENTS

KR    20220043839 A  *  4/2022  ............ G06Q 10/02
WO    2020/117302 A1    6/2020

OTHER PUBLICATIONS

Yeom, "Method for sharing contents using intermediary server" (English), KR 2022-0043839 A, Apr. 5, 2022, total 12 pages. (Year: 2022).*

(Continued)

*Primary Examiner* — Gil H. Lee
*Assistant Examiner* — Chhian (Amy) Ling
(74) *Attorney, Agent, or Firm* — Kilpatrick Townsend & Stockton LLP

(57) ABSTRACT

A method of sharing smart home devices between applications may include receiving a request from a first application operating on a control device to share a smart home device that registered with the first application; generating an interface on the control device that displays one or more applications with which the smart home device can be shared; receiving a selection of a second application with which to share the smart home device; and sending information to the second smart home device to register the smart home device.

19 Claims, 9 Drawing Sheets

(56) References Cited

U.S. PATENT DOCUMENTS

| | | | | |
|---|---|---|---|---|
| 2019/0238358 A1* | 8/2019 | Hurewitz | ............... | G06N 20/00 |
| 2019/0356705 A1* | 11/2019 | Escudero | ............ | H04L 65/1094 |
| 2020/0241493 A1* | 7/2020 | Milevschi | .......... | G05B 23/0272 |
| 2021/0132559 A1* | 5/2021 | Ni | ........................ | G05B 19/042 |
| 2022/0345565 A1* | 10/2022 | Carrigan | ............... | G06F 3/0482 |

OTHER PUBLICATIONS

International Search Report and Written Opinion for PCT/US2022/047285 mailed Jan. 24, 2023, all pages.

Sikden Amit Kumar et al: "A Survey on Sensor-Based Threats and Attacks to Smart Devices and Applications", IEEE Communications Surveys & Tutorials, IEEE, USA, vol. 23, No. 2, Mar. 8, 2021, pp. 1125-1159, XP011856169, DOI: 10.1109/COMST.2021.3064507 [retrieved on May 20, 2021] Section "IV. Existing Sensor Management Systems and Security Needs in Smart Devices".

* cited by examiner

OPERATING-SYSTEM-LEVEL PERMISSION MANAGEMENT FOR MULTI-ECOSYSTEM SMART-HOME DEVICES

CROSS-REFERENCE TO RELATED APPLICATIONS

This application claims priority to U.S. Provisional Application Ser. No. 63/270,042, filed Oct. 20, 2021, which is incorporated here by reference.

TECHNICAL FIELD

This patent specification relates to systems, methods, and related computer program products for managing permissions for smart home devices. More particularly, this specification relates to techniques for sharing a device that is registered with one application to a second application using a customized share sheet for an operating system.

BACKGROUND

A smart home refers to a home that includes smart home devices that are networked together to form an ecosystem for automation, providing information and entertainment, and controlling electronic devices. A smart home ecosystem includes smart home devices that work together to accomplish tasks or share information using wired or wireless communication protocols. The advantages of using a smart home ecosystem are numerous, including providing a seamless user experience and compatibility between devices without adapters or other bridge protocols/devices to enable communication and information sharing. However, not all ecosystems of connected devices are open to devices for manufacturers outside of those ecosystems. Integrating smart home devices from one ecosystem into another ecosystem can pose technical challenges for control devices and network communications. Additionally, commissioning and registering these devices with an existing ecosystem can be a frustrating and problematic process for users. Difficulty can even arise when sharing a device registered with one application with another application on the same control device. Therefore, improvements are needed in the art.

BRIEF SUMMARY

In some embodiments, a method of sharing smart home devices between applications may include receiving a request from a first application operating on a control device to share a smart home device that is registered with the first application; generating a user interface on the control device that displays one or more applications with which the smart home device can be shared; receiving a selection of a second application with which to share the smart home device; and sending information to the second application to register the smart home device with the second application.

In some embodiments, a non-transitory computer-readable medium may include instructions that, when executed by one or more processors, cause the one or more processors to perform operations including receiving a request from a first application operating on a control device to share a smart home device that is registered with the first application; generating a user interface on the control device that displays one or more applications with which the smart home device can be shared; receiving a selection of a second application with which to share the smart home device; and sending information to the second application to register the smart home device with the second application.

In some embodiments, a control device may include one or more processors and one or more memory devices. The one or more memory devices may include instructions that, when executed by the one or more processors, cause the one or more processors to perform operations including receiving a request from a first application operating on a control device to share a smart home device that is registered with the first application; generating a user interface on the control device that displays one or more applications with which the smart home device can be shared; receiving a selection of a second application with which to share the smart home device; and sending information to the second application to register the smart home device with the second application.

In any embodiments, any or all of the following features may be implemented in any combination and without limitation. The control device may include a smart phone. The smart home device may include a thermostat, a hazard detector, a component of security system, a smart doorbell, a video camera, a child monitor, a smart appliance, an audio speaker, and/or any other smart home device. The second application may be operating on the control device with the first application. The second application may be operating on a second control device. Sending the information to the second application may include generating a QR code in the user interface to be scanned by the second control device, where the QR code may include information for registering the smart home device with the second application. The user interface may include an augmented share sheet generated by an operating system of the control device. Receiving the request from the first application may include a command to share any of a plurality of smart home devices registered with the first application. The method/operations may also include selecting the smart home device from the plurality of smart home devices registered with the first application using the user interface. The method/operations may also include sending a request to an operating system of the control device to return a list of the one or more applications with which the smart home device can be shared. The method/operations may also include accessing, by the operating system, metadata of the applications that indicates that the one or more applications are compatible with the smart home device. Sending the information to the second application may include the operating system sending the information via a secure communication utility of the operating system. The second application may use a universal setup utility of the operating system to register the smart home device with the second application using a multi-ecosystem protocol. The first application may place the smart home device in a multi-admin mode such that the first application and the second application can both administer the smart home device. Sending the information to the second application may include generating a pairing code and passing the pairing code to the second application. The pairing code may be embedded in a QR code generated in the user interface. The first application may be from a first smart home ecosystem, and the second application may be from a second smart home ecosystem. The smart home device may be from a third smart home ecosystem.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
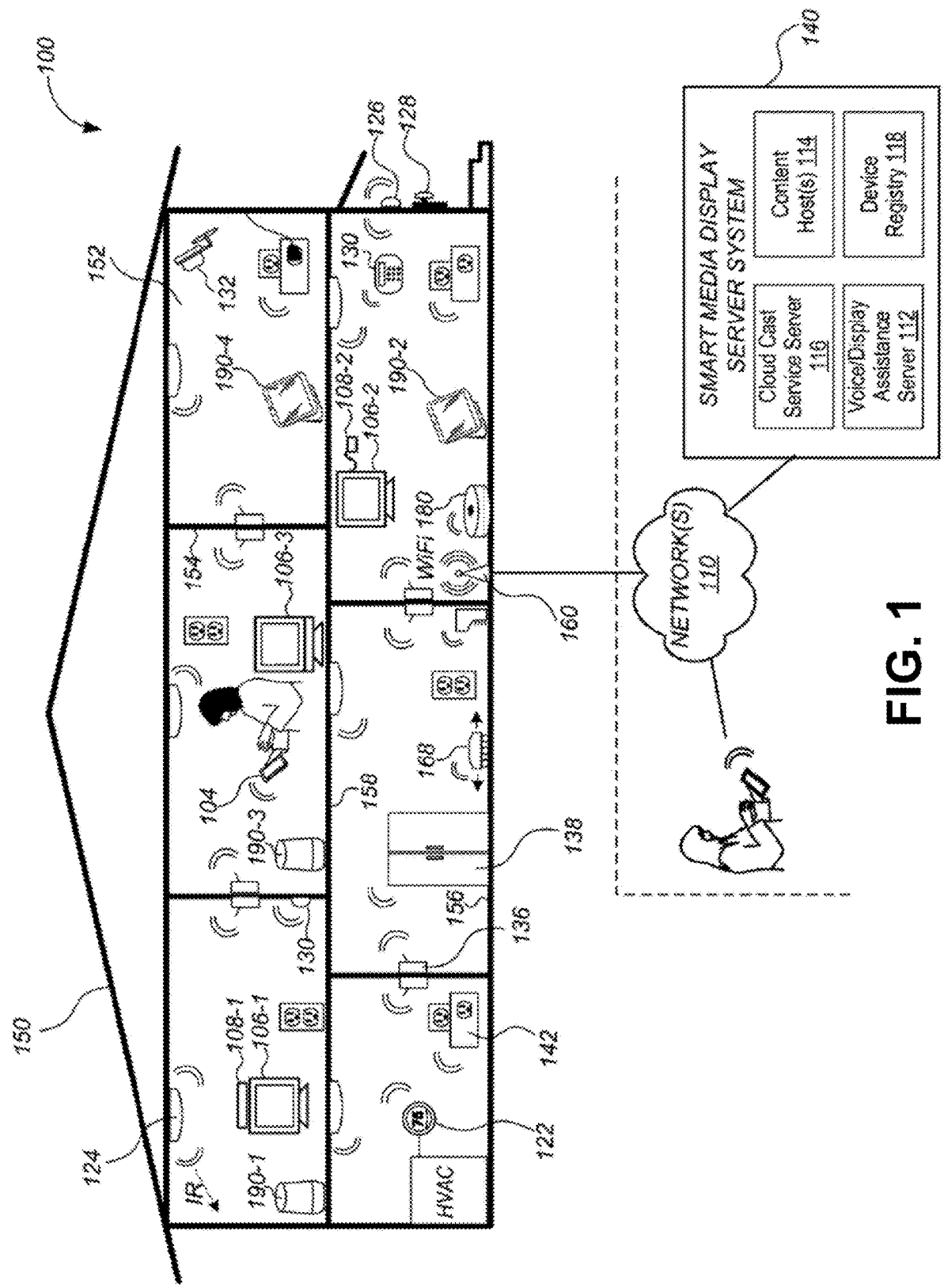
FIG. 1 illustrates an example smart home environment in accordance with some embodiments.

FIG. 1 illustrates an example smart home environment 100 in accordance with some embodiments. The smart home environment 100 includes a structure 150 (e.g., a house, office building, garage, or mobile home) with various integrated devices (also referred to herein as "connected" or "smart" devices). It will be appreciated that smart devices may also be integrated into a smart home environment 100 that does not include an entire structure 150, such as an apartment, condominium, or office space. In some implementations, the smart devices include one or more of: personal client devices 104 (e.g., tablets, laptops or mobile phones), display devices 106, media casting or streaming devices 108, thermostats 122, home protection devices 124 (e.g., smoke, fire and carbon dioxide detector), home security devices (e.g., motion detectors, window and door sensors and alarms), including connected doorbell/cameras 126, connected locksets 128, alarm systems 130 and cameras 132, connected wall switches transponders 136, connected appliances 138, WiFi communication devices 160 (e.g., hubs, routers, extenders), connected home cleaning devices 168 (e.g., vacuum or floor cleaner), smart home communication and control hubs 180, voice assistant devices and display assistant devices 190, and/or other smart home devices.

It is to be appreciated that the term "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide users with access to media content that is stored locally or streamed from a remote content source (e.g., content host(s) 114). In some implementations, the media devices include media output devices 106, which directly output/display/play media content to an audience, and/or cast devices 108, which stream media content received over one or more networks to the media output devices 106. Examples of the media output devices 106 include, but are not limited to, television (TV) display devices, music players and computer monitors. Examples of the cast devices 108 include, but are not limited to, medial streaming boxes, casting devices (e.g., GOOGLE CHROMECAST devices), set-top boxes (STBs), DVD players, TV boxes, and so forth.

In the example smart home environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-3 includes a smart TV device that integrates an embedded casting unit to stream media content for display to its audience. The media output device 106-2 includes a regular TV display that is coupled to a TV box 108-1 (e.g., Google TV or Apple TV products), and such a TV box 108-2 streams media content received from a media content host server 114 and provides an access to the Internet for displaying Internet-based content on the media output device 106-2.

In addition to the media devices 106 and 108, one or more electronic devices 190 and are disposed in the smart home environment 100. Electronic devices 190 are display assistant devices and/or voice assistant devices. In some implementations, the display assistant device 190 is also a voice assistant device. The electronic devices 190 collect audio inputs for initiating various media play functions of the devices 190 and/or media devices 106 and 108. In some implementations, the devices 190 are configured to provide media content that is stored locally or streamed from a remote content source. In some implementations, the electronic devices 190 are voice-activated and are disposed in proximity to a media device, for example, in the same room with the cast devices 108 and the media output devices 106. Alternatively, in some implementations, a voice-activated display assistant device 190-1 is disposed in a room having one or more smart home devices but not any media device. Alternatively, in some implementations, a voice-activated electronic device 190 is disposed in a location having no networked electronic device. This allows for the devices 190 to communicate with the media devices and share content that is being displayed on one device to another device (e.g., from device 190-1 to device 190-2 and/or media devices 108).

The voice-activated electronic device 190 includes at least one microphone, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, an electronic device 190 is a voice interface device that is network-connected to provide voice recognition functions with the aid of a server system 140. In some implementations, the server system 140 includes a cloud cast service server 116 and/or a voice/display assistance server 112. For example, in some implementations an electronic device 190 includes a smart speaker that provides music (e.g., audio for video content being displayed on the device 190 or on a display device 106) to a user and allows eyes-free and hands-free access to a voice assistant service (e.g., Google Assistant). Optionally, the electronic device 190 is a simple and low cost voice interface device, e.g., a speaker device and a display assistant device (including a display screen having no touch detection capability).

In some implementations, the voice-activated electronic devices 190 integrates a display screen in addition to the microphones, speaker, processor and memory (e.g., 190-2 and 190-4), and are referred to as "display assistant devices." The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the kitchen device.").

Specifically, in some implementations, an electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Play cat videos on my Living room TV." The personal assistant service then fulfils the media play request by playing the requested media content on the requested device using a default or designated media application.

In some implementations, the display assistant device includes a display screen and one-or more built in cameras (e.g., 190-4). The cameras are configured to capture images and/or videos, which are then transmitted (e.g., streamed) to a server system 140 for display on client devices(s).

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

In some implementations, the smart home devices in the smart home environment 100 includes, but are not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100

(e.g., a setting to display content captured by the camera systems during the evening or in response to detecting an intruder).

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors.

In some implementations, in addition to containing sensing capabilities, devices 122, 124, 126, 128, 130, 132, 136, 138, and 190 (which are collectively referred to as "the smart home devices" or "the smart home devices") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices via a wireless router. The cast devices 108, the electronic devices 190 and the smart home devices may further communicate with each other via a connection (e.g., network interface 160) to a network, such as the Internet 110. Through the Internet 110, the cast devices 108, the electronic devices 190 and the smart home devices may communicate with a server system 140 (also called a central server system and/or a cloud-computing system herein). Optionally, the server system 140 may be associated with a manufacturer, support entity, or service provider associated with the cast devices 108 and the media content displayed to the user.

In general, any of the connected electronic devices described herein can be configured with a range of capabilities for interacting with users in the environment. For example, an electronic device can be configured with one or more microphones, one or more speakers and voice-interaction capabilities in which a user interacts with the device display assistant device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, and with haptic or other tactile feedback capabilities to provide tactile outputs to users. An electronic device can also be configured with visual output capabilities, such as a display panel and/or one or more indicator lights to output information to users visually. In addition, an electronic device can be configured with movement sensors that can detect movement of objects and people in proximity to the electronic device, such as a radar transceiver(s) or Passive Infrared (PIR) detector(s).

Inputs received by any of these sensors can be processed by the electronic device and/or by a server communicatively coupled with the electronic device (e.g., the server system 140 of FIG. 1). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment, or by a server communicatively coupled with the electronic device. This transmitted information can be of virtually any type that is displayable/playable by the output capabilities of the electronic device.

The server system 140 provides data processing for monitoring and facilitating review of events (e.g., motion, audio, security, etc.) from data captured by the smart devices, such as video cameras 132, smart doorbells 126, and display assistant device 190-4. In some implementations, the server system 140 may include a voice/display assistance server 112 that processes audio inputs collected by voice-activated electronic devices 190, one or more content hosts 114 that provide the displayed media content, and a cloud cast service server 116 creating a virtual user domain based on distributed device terminals. The server system 140 also includes a device registry for keeping a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain. In some implementations, each of these functionalities and content hosts is a distinct server within the server system 140. In some implementations, a subset of these functionalities is integrated within the server system 140.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2:
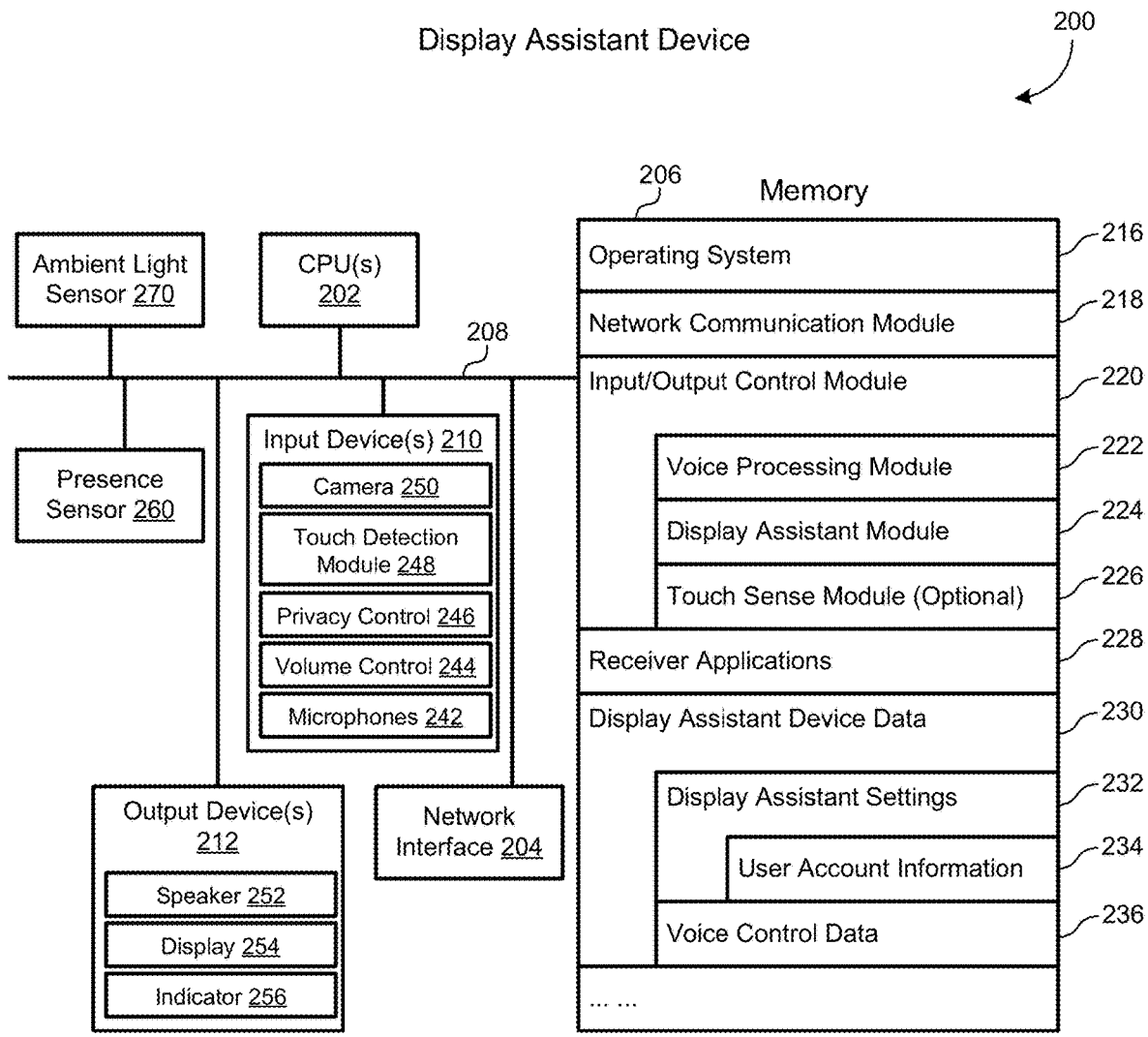
FIG. 2 is a block diagram illustrating an example display assistant device that is applied as a voice interface to collect user voice commands in a smart home environment in accordance with some embodiments.

FIG. 2 is a block diagram illustrating an example display assistant device 200 that is applied as a voice interface to collect user voice commands in a smart home environment 100 in accordance with some embodiments. The display assistant device 200 typically includes one or more processing units (CPUs) 202, one or more network interfaces 204, memory 206, and one or more communication buses 208 for interconnecting these components (sometimes called a chipset). The display assistant device 200 includes one or more output devices 212, including one or more speakers 252, a display 254 and one or more indicators 256. The display assistant device 200 also includes one or more input devices 210 that facilitate user input, including one or more microphones 242, a volume control 244 and a privacy control 246. The volume control 244 is configured to receive a user action (e.g., a press on a volume up button or a volume down button, a press on both volumes up and down buttons for an extended length of time) that controls a volume level of the speakers 252 or resets the display assistant device 200. The privacy control 246 is configured to receive a user action that controls privacy settings of the display assistant device (e.g., whether to deactivate the microphones 242). The one or more indicator 256 is configured to indicate at least whether the microphone 242 is deactivated (e.g., muted). In some implementations, the input devices 210 of the display assistant device 200 include a touch detection module 248 that is integrated on the display panel 254 and configured to detect touch inputs on its surface. In some implementations, the input devices 210 of the display assistant device 200 include a camera module 250 configured to capture a video stream of a field of view. Alternatively, in some implementations, the input devices 210 of the display assistant device 200 does not include any camera or touch detection module, because they are relatively expensive and can compromise the goal of offering the display assistant device 200 as a low cost user interface solution.

In some implementations, the display assistant device 200 further includes a presence sensor 260 configured to detect a presence of a user in a predetermined area surrounding the display assistant device 200. Under some circumstances, the display assistant device 200 operates at a sleep or hibernation mode that deactivates detection and processing of audio inputs, and does not wake up from the sleep or hibernation mode or listen to the ambient (i.e., processing audio signals collected from the ambient) until the presence sensor 260 detects a presence of a user in the predetermined area. An example of the presence sensor 260 is an ultrasonic sensor configured to detect a presence of a user.

In some implementations, the display assistant device 200 further includes an ambient light sensor 270 (e.g., a white ambient light sensor, an RGB color sensor). The ambient light sensor 270 is configured to detect a light condition in the smart home environment 100 where the display assistant device 200 sits. In some implementations, the display assistant device 200 is configure to adjust a brightness level and/or a color tone of its screen according to the light condition. The ambient light sensor 270 are disposed behind a bezel area of the screen of the display assistant device 200, and exposed to light via transparent part of the bezel area.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium.

In some implementations, memory 206, or the non-transitory computer readable storage medium of memory 206, stores the following programs, modules, and data structures, or a subset or superset thereof: (1) Operating system 216 including procedures for handling various basic system services and for performing hardware dependent tasks; (2) Network communication module 218 for connecting the display assistant device 200 to other devices (e.g., the server system 140, cast device 108, client device 104, smart home devices and other voice-activated electronic device(s) 190) via one or more network interfaces 204 (wired or wireless) and one or more networks 110, such as the Internet, other wide area networks, local area networks, metropolitan area networks, and so on; (3) Input/output control module 220 for receiving inputs via one or more input devices 210 enabling presentation of information at the display assistant device 200 via one or more output devices 212.

The one or more output devices may include: (1) Voice processing module 222 for processing audio inputs or voice messages collected in an environment surrounding the display assistant device 200, or preparing the collected audio inputs or voice messages for processing at a voice/display assistance server 112 or a cloud cast service server; (2) Display assistant module 224 for displaying additional visual information including but not limited to a media content item (e.g., a YouTube video clip), news post, social media message, weather information, personal picture, a state of audio input processing, and readings of smart home devices; and/or (3) Touch sense module 226 for sensing touch events associated with the touch detection module 248 on a top surface of the display assistant device 200.

The memory 206 may also include one or more receiver application 228 for responding to user commands extracted from audio inputs or voice messages collected in an environment surrounding the display assistant device 200, including but not limited to, a media play application, an Internet search application, a social network application and a smart device application. The memory 206 may also include Display assistant device data 230 storing at least data associated with the display assistant device 200. The data may include display assistant settings 232 for storing information associated with the display assistant device 200 itself, including common device settings (e.g., service tier, device model, storage capacity, processing capabilities, communication capabilities, etc.) and information of a user account 234 in a virtual user domain to which the display assistant device 200 is linked. The data may also include voice control data 236 for storing audio signals, voice messages, response messages and other data related to voice interface functions of the display assistant device 200.

In some implementations, the input/output control module 220 further includes an image processing module (not shown) configured to process image data captured by the camera module 250. Specifically, in an example, the image processing module is configured to analyze the image data captured by the camera module 250 and associate biometric features (e.g., face, voice and gesture) recognized from the image data with known or unknown users. User profiles can be selected based on the biometric features to control the display assistant device 200 itself, cast devices 106 or smart home devices adaptively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

The smart home environment described above continues to proliferate in homes across the world. Specifically, smart home devices have been developed to control almost every aspect of the home experience, from speakers, smart appliances, security systems, thermostats, hazard detectors, doorbells, and so forth as described in detail above in FIG. 1. As the number of different devices continues to expand, the number of different smart home device manufacturers also continues to grow. Many companies now manufacture and sell smart home devices, thus giving customers a wide array of products from which to choose. While some customers may prefer to use smart home devices exclusively from one manufacturer, other customers may prefer to pick and choose devices from different manufacturers according to the advantages and disadvantages offered by each.

Although customers may wish to use devices from many different manufacturers, it is often convenient for all the smart home devices in a structure (e.g., a home or an office building) to be controlled and operated through a single cohesive system or interface. Previously, each smart home device manufacturer provided their own "ecosystem" for controlling and monitoring smart home devices. Adding a new device from another manufacturer often required the installation and maintenance of multiple smart home ecosystems together. As used herein, the term "ecosystem" a software system and/or operating environment provided by a single manufacturer. For example, the most popular smart home ecosystems at the time of this disclosure include Google Home®, Amazon Alexa®, Apple Homekit®, Samsung SmartThings®, and so forth. Each ecosystem may define its own communication protocols and may be configured to work with devices from the same manufacturer. Each ecosystem may also be controlled by a smart home hub, such as the Nest Hub® and/or by a server. Each ecosystem may also be controlled by an application, such as the Google Home® app operating on a smart phone or other electronic device. As described below, each ecosystem may be primarily configured to use devices from the same manufacturer, however ecosystems may also be configured to accept registration and use of devices from other ecosystems. For example, the Google Home® app may be used to monitor, control, and interact with devices from Google® and from other manufacturers together as part of the same smart home environment.

Figure 3:
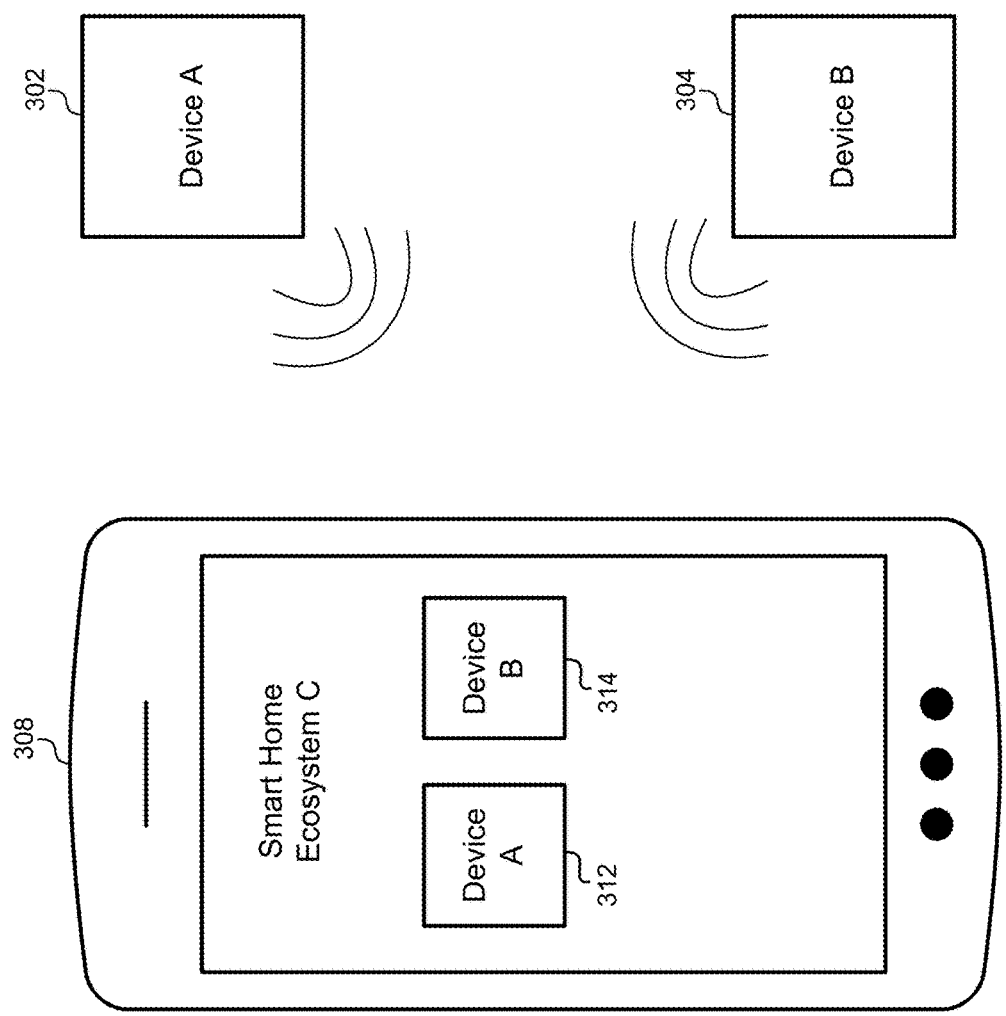
FIG. 3 illustrates an example of smart home devices operating within a structure, according to some embodiments.

FIG. 3 illustrates an example of smart home devices operating within a structure, according to some embodiments. In this example, it may be assumed that a first device 302 (e.g., a thermostat) may be provided from a first manufacturer, and may thus be compatible with a first ecosystem provided by the first manufacturer. Within the same enclosure, a second device 304 (e.g., a security system) may also be installed that is provided by a second manufacturer. The second device 304 may be compatible with a second ecosystem and provided by the second manufacturer. Each ecosystem may be controlled and monitored by a control device 308, such as a smart phone or digital home assistant.

In some cases, each ecosystem would be represented by a different application ("app") on a smart phone or a different control device. For example, a different home assistant device (e.g., a display assistant device and/or a voice assistant device) may be used to control its own corresponding ecosystem. Thus, the first device 302 would be controlled by a first home assistant associated with the first ecosystem, while the second device 304 would be controlled by a second home assistant associated with the second ecosystem. Alternatively, a user's smart phone could include "home" applications for each ecosystem. In order to control all the devices in a multi-ecosystem home, a user would need to toggle back and forth between multiple apps and/or multiple control devices. For example, two ecosystems may operate independently in parallel with each other to accommodate the first device 302 and the second device 304 from different manufacturers.

Recently, efforts have been made to generate an industry-unifying standard that allows devices from separate ecosystems to work together seamlessly in a single environment. This allows smart home devices to work together reliably when purchased from different manufacturers. For example, the MATTER® connectivity standard is built upon the Internet Protocol (IP) and runs on, for example, Wi-Fi and Thread network layers through Bluetooth Low Energy (BLE) for commissioning devices. This unifying protocol enables communication across smart home devices, mobile apps, cloud services, and other devices. The MATTER® standard is an open source, unified connectivity protocol that allows communications between devices from multiple manufacturers (e.g., Google®, Amazon®, Apple®, and so forth). For example, a Google Home® or a Google Hub® may be used to control a Google Nest Thermostat® alongside speakers from another manufacturer, a security system from another manufacturer, etc., in a unified interface. Alternatively, the Google Home® smart phone app may be used to control a Google Nest® doorbell, along with a smart appliance from another manufacturer within the same app. Although the MATTER® standard is used here is an example, this disclosure uses the term "multi-ecosystem protocol" to generically refer to any application layer protocol that allows different smart home ecosystems and devices to interoperate, for which the MATTER® standard represents one example.

For example, FIG. 3 illustrates how the first device 302 and the second device 304 can be controlled on the same control device 308 operating a single control application. The application may include a unified interface that is provided from a manufacturer that is different from the manufacturers providing the first device 302 and the second device 304. For example, the ecosystem for the application on the control device 308 may display icons 312, 314 for the first device 302 and the second device 304 together such that the first device 302 and the second device 304 can be controlled together in the same smart home control app. The application may allow the user to control, monitor, install, and provision smart home devices 302, 304 and any devices from any ecosystem and/or manufacturer in a single application. Although not shown explicitly in FIG. 3, the same interface may be provided on a digital home assistant (e.g., display assistant or voice assistant) as described above.

Using a multi-ecosystem protocol enables the interoperability between devices in different ecosystems illustrated in FIG. 3. For example, the first device 302 and/or the second device 304 may both operate according to the standards defined by the multi-ecosystem protocol. Specifically, the multi-ecosystem protocol operating, for example, on Wi-Fi and Thread network layers using BLE for device setup may allow the first device 302 and/for the second device 304 to be commissioned individually and controlled within the separate ecosystem of the application operating on the control device 308. For some devices, compatibility with the multi-ecosystem protocol be implemented using a firmware update. Alternatively, some newer devices may come with compatibility already built-in with the multi-ecosystem protocol.

Using the multi-ecosystem protocol alleviates some of the communication problems that have plagued the adoption of multi-ecosystem smart home devices. As described above, users were often confused on how to discover, set up, and/or control their devices in and across multiple smart home ecosystems. In particular, the proliferation of a variety of smart home protocols, such as Zigbee®, HomeKit®, Z-Wave®, and others caused incompatibility that may be solved by the multi-ecosystem protocol. This protocol clearly defines network layers to ensure compatibility of the communication stack. However, a multi-ecosystem protocol only attempts to provide compatibility between devices. On its own, the multi-ecosystem protocol does not solve problems of device commissioning, device sharing, and other common task that accompany interoperability.

The embodiments described herein provide additional improvements on top of the multi-ecosystem protocol. One of the key user journeys and pain points involves adding devices from one app or ecosystem experience to another. For example, sharing a smart light from a third-party manufacturer with the Google Home® app involves adding a device from one manufacturer into an ecosystem of another. Even though the underlying communication is standardized, the user experience is still unique and cumbersome for each different device and/or manufacturer. This typically requires creating multiple accounts in multiple apps, and navigating complex linking flows to complete the integration of the new device. These linking flows are often bespoke between different apps and ecosystems, making it difficult to develop a consistent, familiar pattern for users. Additionally, some devices may have proprietary protocols that are tightly coupled with their associated mobile apps. These devices may require users to navigate individual apps for each device manufactured in order to set up the device and register the device with their chosen ecosystem or platform. This adds additional steps and unnecessary apps to an already frustrating user experience.

The embodiments described herein optimize this process of integrating devices from different ecosystems by sharing permissions between apps. Specifically, some embodiments include methods and systems for users to share one or more devices paired to or registered with a first mobile application with a second mobile application by guiding the user through a familiar set of steps. These embodiments may conceptually (but not functionally) extend the concept of a "share sheet" where one app can share text with another app. However, instead of sharing simple text, these embodiments allow applications to share devices. For example, an application can generate an extended or customized version of a share sheet indicating that they are sharing a device, such as a smart lightbulb. The user may be allowed to select an application with which the device should be shared from the originating application. The device may then be placed in a multi-admin commissioning mode, and a passcode may be generated. The passcode may be sent to a third-party app to complete the sharing process.

Figure 4:
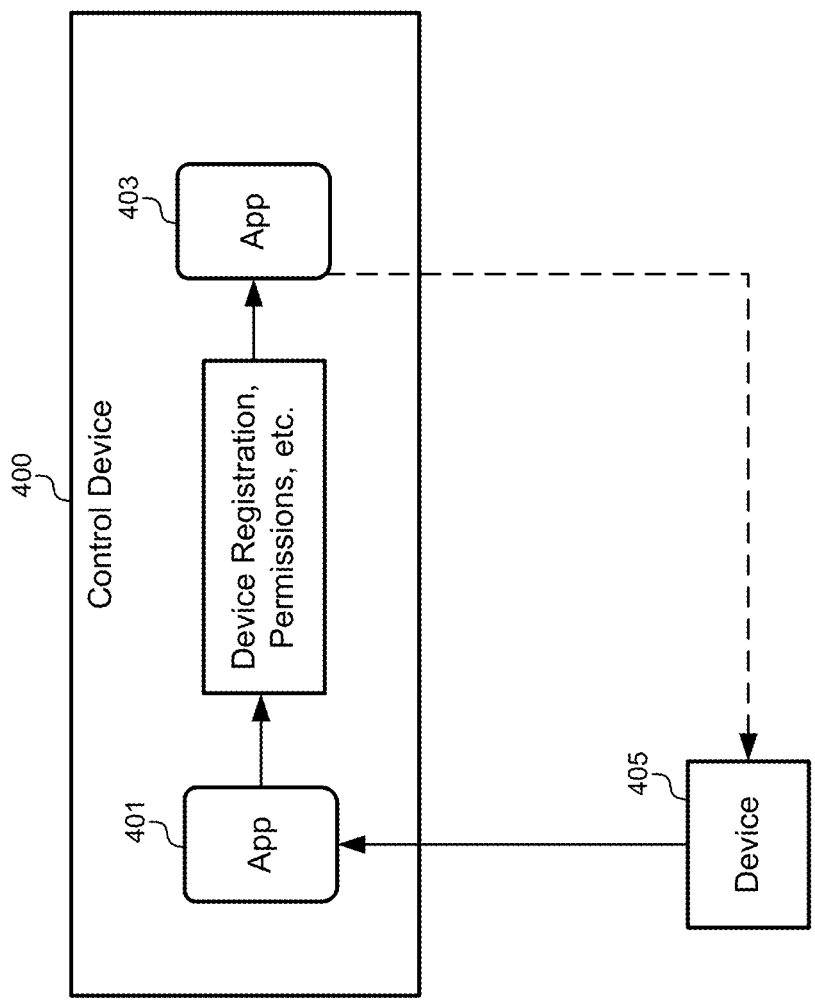
FIG. 4 illustrates a sequence of steps that may be executed by a control device to share a device between apps, according to some embodiments.

FIG. 4 illustrates a sequence of steps that may be executed by a control device to share a device between apps, according to some embodiments. The process may begin with a first app 401 that is executed by a control device 400, such as a smart phone, a tablet computer, a smart watch, and/or any other computing device. The first app 401 may be configured to control smart home devices in the smart home environment of the structure. For example, the first app 401 may be a control app for a smart home ecosystem (e.g., the Google Home® app). Alternatively, the first app 401 may be a proprietary or customized app that is configured to specifically interface with a smart home device. For example, the first app 401 may be configured to control a smart lightbulb, and may be provided from a manufacturer of the smart lightbulb. In these cases, the first app 401 may be configured to specifically control the smart lightbulb without necessarily being configured to control other smart home devices in the smart home environment.

The smart home device 405 may include any smart home device that is already registered with the first app 401. For example, the commonly assigned U.S. patent application Ser. No. 17/838,736, which is incorporated herein by reference in its entirety, describes methods for registering and commissioning new smart home devices with a smart home ecosystem. The smart home device 405 may include any smart home device, including the smart home devices described above in FIG. 1, such as thermostats, hazard detectors, security systems, video cameras, streaming consoles, smart appliances, and so forth. The smart home device 405 may be commissioned on the local network and registered with the first app 401. For example, the first app 401 may receive status data from the smart home device 405, may send commands to the smart home device 405, may generate automation sequences involving the smart home device 405, and so forth. The smart home device may also interact with other smart home devices in the ecosystem controlled by the first app 401.

In order to maintain the security and secure communications associated with smart home devices, the first app 401 may be any application with administrative privileges for the device 405. For example, permissions or credentials may be required in order to register the smart home device 405 with a new app or control device. This prevents malicious actors from commandeering smart home devices when they gain access to a network connection or when they are within wireless transmission range. This prevents the easy sharing of smart home devices between applications on different devices, as well as between applications on the same device. However, the embodiments described herein allow a user to share registration information of a smart home device 405 between applications on the same control device 400. When initiated by a user, and when shared between apps on the same control device 405, the operating system of the control device 300 can facilitate this sharing of permissions and registration information between apps, as this process is unlikely to be used by a malicious actor.

The first app 401 may call a core API from the operating system, which may generate an augmented share sheet that has been customized to share devices. As used herein, the term "share sheet" refers to a user interface that allows the user to share or text or other symbol data from one application to another application. For example, a user may select a text string in one application and summoned the share sheet for the application. The share sheet may identify other applications on the control device 400 that use the core API from the operating system to receive text. The user may then select one of the applications that have populated the share sheet, and the text or simple data may be sent to that application.

In these embodiments, the core API from the operating system may be modified to generate an augmented share sheet. This augmented share sheet may be different from the traditional share sheet provided by the platform. Specifically, instead of sharing text, images, files, etc. between applications, this augmented share sheet may provide a unique user experience that clearly indicates to the user that they are sharing a device between apps. As described in detail below, the augmented share sheet allows the user to view smart home devices registered with the first app 401, select a smart home device from the list of registered devices, choose a compatible second app 403, and initiate the sharing of registration and permissions between the two apps 401, 403. Note that some embodiments of the operating system may provide a custom share sheet that is specifically designed to handle the sharing of smart home devices between apps. However, some embodiments may also leverage the existing share sheet utility provided by the platform by augmenting existing functionality with the ability to share a device.

Figure 5A:
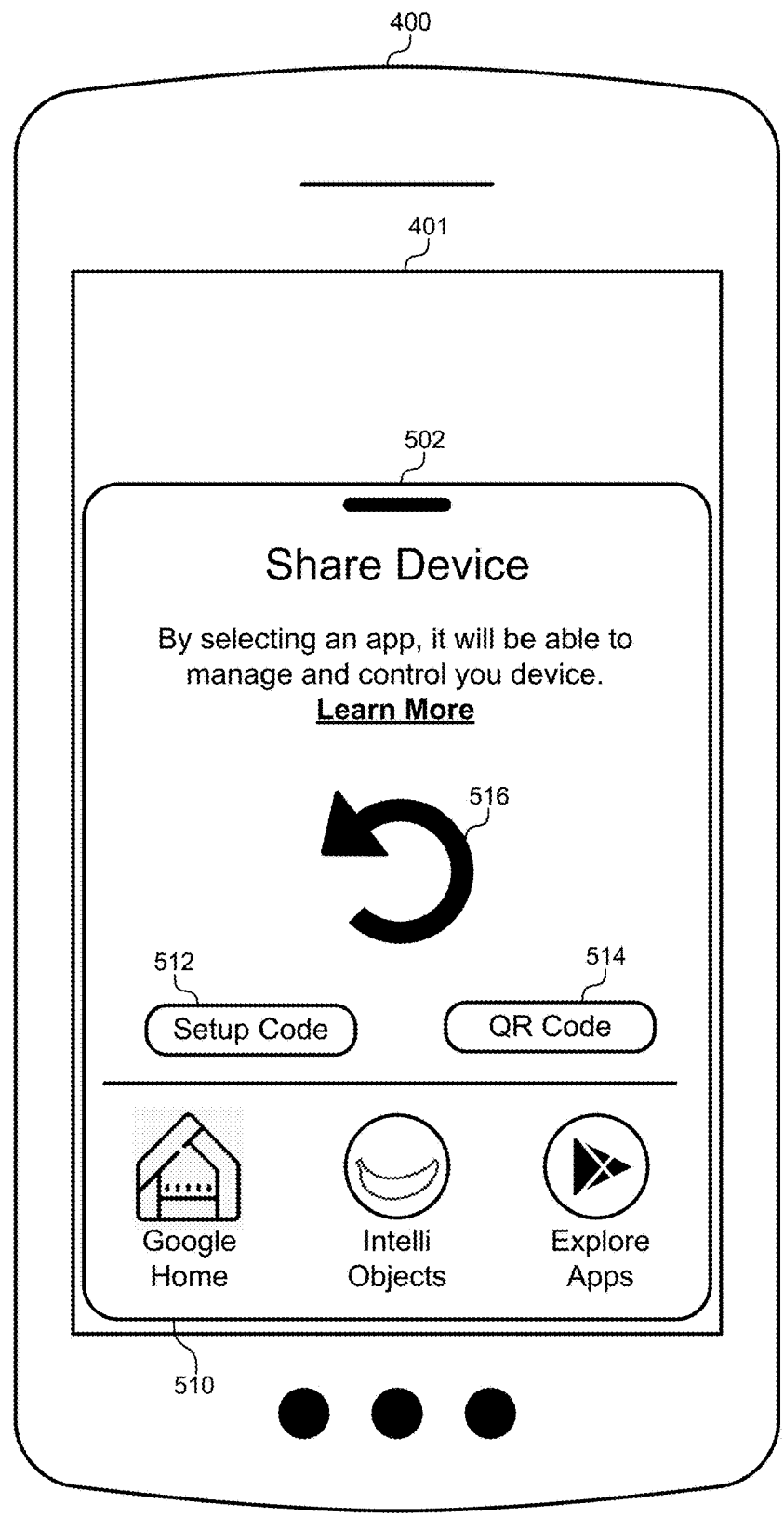
FIG. 5A illustrates a user interface for sharing registered smart home devices between apps, according to some embodiments.

FIG. 5A illustrates a user interface 502 for sharing registered smart home devices between apps, according to some embodiments. The user may tap a control on the first app 401 for sharing a smart home device. For example, the first app 401 may provide a menu item or contextual menu that includes a share command when selecting individual smart home devices that are managed by the first app 401.

When the user interface 502 is initiated, the user interface 502 may query the operating system for a list of apps that can receive a new device shared from the first app 401. The operating system may maintain a list of apps that are registered with the operating system as being compatible with the control and interaction with smart home devices. For example, when the second app 403 is installed on the control device 400, the second app 403 may register with the operating system as being compatible with smart home device registrations. Thus, when the user interface 502 is initiated, the first app 401 may query the operating system to retrieve the list of registered apps that are compatible with smart home devices. In some embodiments, different device types may be compatible with different application types. Thus, if a specific device is used to initiate the user interface 502, the first app 401 may provide the device type to the operating system, which may in turn provide list of installed apps that are compatible with that specific device type.

This list of available apps 510 may be listed at the bottom of the user interface 502. For example, icons may be displayed for each of the available apps 510. Additionally, some share sheets may also include controls 512, 514 that can be used to generate a QR code or other passcode for sharing the device with other ecosystems. The QR code or passcode can be used to share a device between control devices (e.g., sharing a device between apps on two separate phones rather than between apps on a single phone). The QR code can be displayed on the screen of a first phone and the image of the QR code can be captured by the second phone to share the device with an app on the second phone. Therefore, some embodiments may allow the control device 400 to share the registration of the smart home device with another app that is operating on a second control device that is separate and distinct from the control device 400.

After the user interface 502 is initiated, the user interface 502 may begin to search for devices that are registered with the first app 301 (indicated by the spinning "wait" icon) 516. The search may be executed when a network call is performed to retrieve a list of devices. Alternatively, some embodiments may already have the device to be shared selected by the app when the user interface 502 is generated. For example, the first app 401 may already provide a list of devices that can be shared from the current app, and the user may select the device from the list such that the user interface 502 is already populated with the device.

Figure 5B:
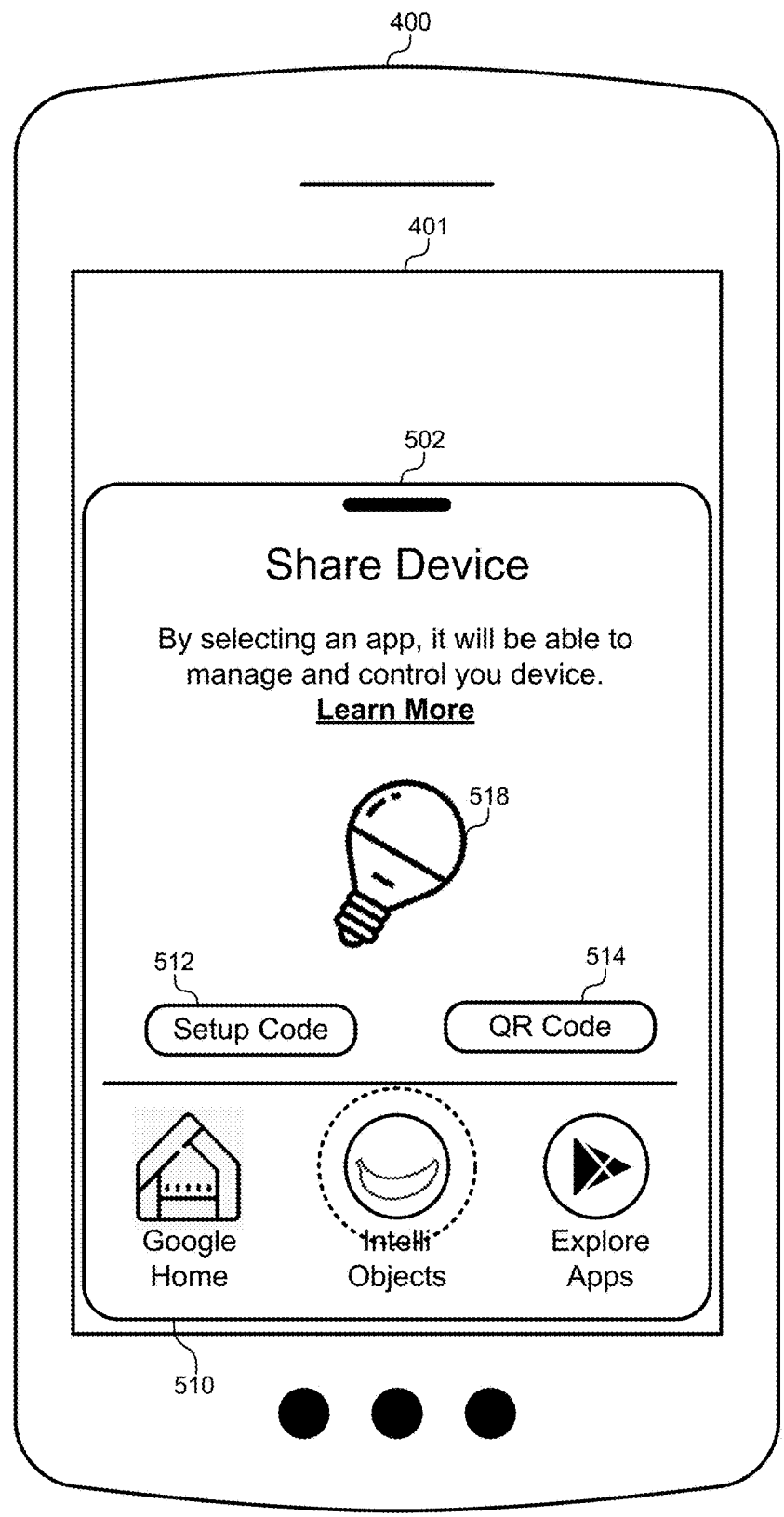
FIG. 5B illustrates an example of the user interface with a selected smart home device for sharing between apps, according to some embodiments.

FIG. 5B illustrates an example of the user interface 502 with a selected smart home device for sharing between apps, according to some embodiments. The user interface 502 illustrates how a customized share sheet can generate an image or other graphical indicator, such as an icon 518, of the device to be shared. In this case, a lightbulb is to be shared from the first app 401 and the second app 403. In this example, the icon 518 may have been selected from a list of icons representing smart home devices registered with the first app 401. Alternatively, the icon 518 may have populated the user interface 502 after being selected before the user interface 502 is initiated.

The user interface 502 may continue to show a list of apps 510 that can receive the device to be shared. The user interface 502 may indicate that by selecting an app, that app will be able to manage and control the device. Note that the first app 401, the second app 403 selected to share the device, and the device itself may all be from different ecosystems. The user interface 502 may provide the user a list of destination apps 510 that the chosen device can also be registered with, as well as the ability to copy a setup code or QR code if the user wants to link the device with a platform or app that is not on the control device 400 (e.g., installed on their mobile phone). In addition to the registration process described above, the list of destination apps 510 may be registered by indicating in their metadata that they can receive access to smart home devices through this utility.

The user interface 502 illustrates how the device can be shared between the two apps 401, 403. When the device and the second app 403 are selected in the user interface 502, the device may be placed in a multi-admin mode that allows both the first app 401 and the second app 403 to administer the device. Within the first app 301, the device may be placed in a commissioning mode for the multi-ecosystem protocol so that metadata may be passed to the user interface 502 to populate the devices in the pairable state. A pairing code may then be generated representing secret information. This pairing code may then be passed over to the second app 403 using a secure operating system communication utility (e.g., using an Android® Intent). After the pairing code is received by the second app 403, the second app 403 can go through the setup process with the device. In some embodiments, a universal set up utility may be provided by the operating system that handles the setup process for the device to be registered with the second app 403 using the multi-ecosystem protocol. This process is described in detail in the commonly assigned U.S. patent application Ser. No. 17/838,736. Alternatively, the second app 310 may use its own set up flow to set up the device if necessary. After setup, the device may now be registered and active in both apps, which may represent two separate ecosystems or may be part of the same ecosystem.

This same sharing and setup process may be executed between apps on separate control devices. Instead of passing the pairing code between apps on the same phone, the pairing code may be embedded in the passcode or QR code that is generated in the user interface of the user interface 502 and captured by the second control device. The control device 400 places the smart home device in multi-admin mode, and the second control device allows the second app 403 to complete the setup process with the smart home device.

Figure 6:
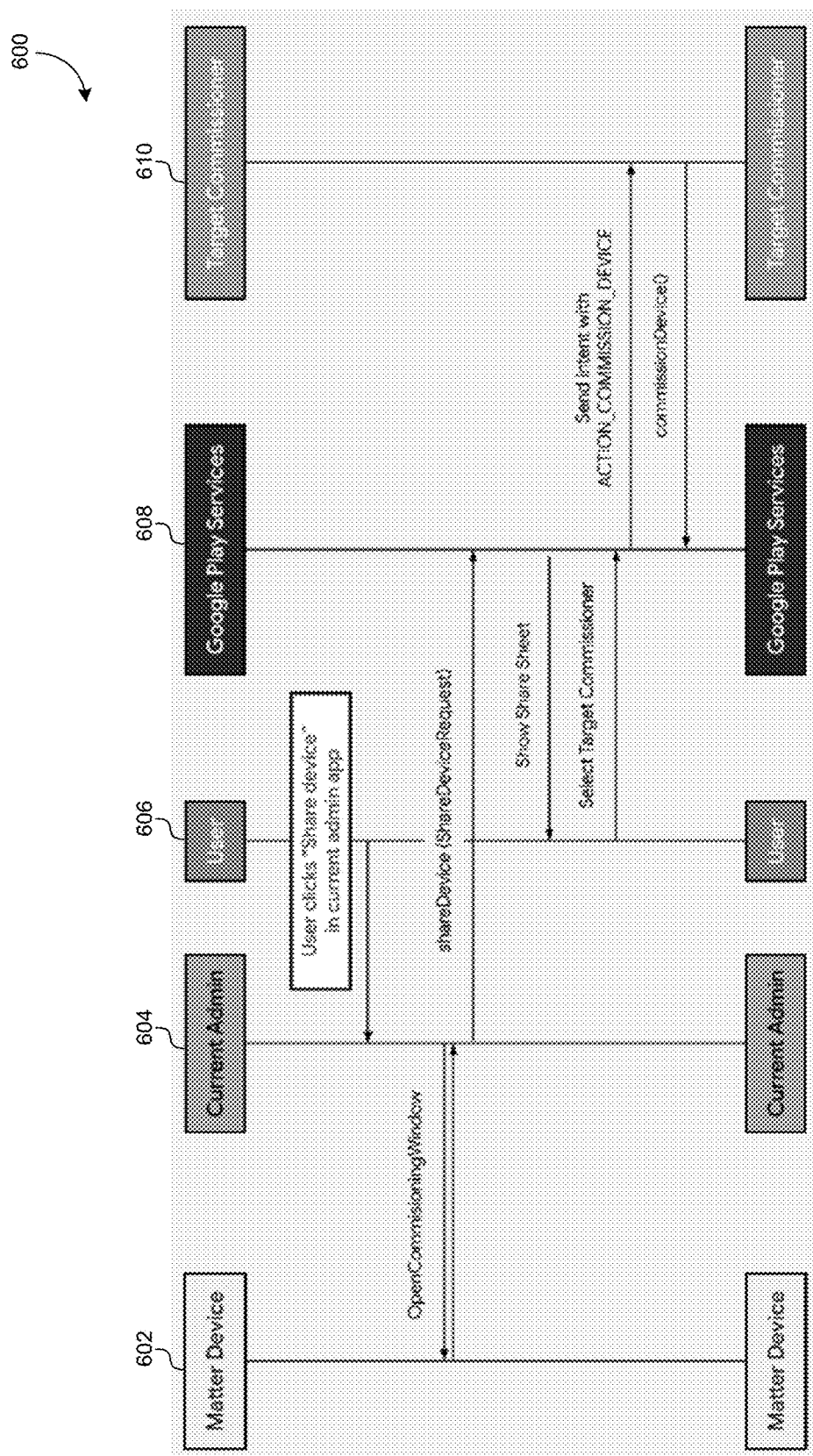
FIG. 6 illustrates a flow diagram of a process for sharing a device between two apps, according to some embodiments.

FIG. 6 illustrates a flow diagram 600 of a process for sharing a device between two apps, according to some embodiments. First, the user 606 may click on a control that indicates they would like to "share a device" registered with the current application 604. The current application may act as a current administrator for the device. The first application 604 may then open a commissioning window with the device 602, such as the user interface 502 described above. In some embodiments, this method may be implemented as a service on a mobile control device, such as universal set up utility service (e.g., implemented in Google Play® services) on the Android® operating system. The first application 604 may send a request to share the device to the service 608. The service 608 may then generate the user interface 502 as described above for display to the user 606. The user 606 may then select a target second application 610 with which the device 602 should be shared. The service may then send a message (e.g., an intent) with information such as a pairing code to the second application 610. The second application 610 may then commission the device 602, which may also use the service 608 to perform the setup of the device 602.

Figure 7:
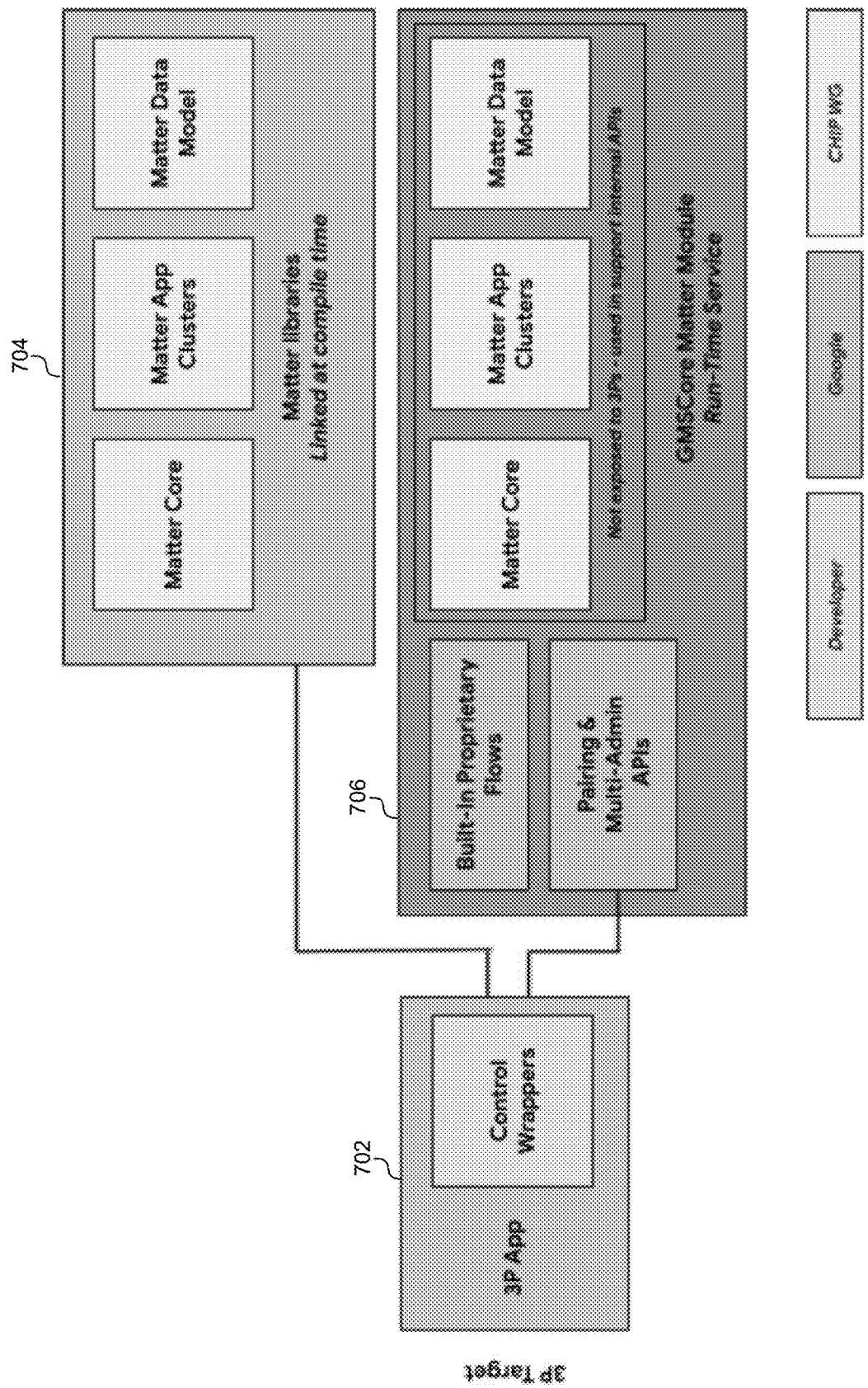
FIG. 7 illustrates a system diagram, according to some embodiments.

FIG. 7 illustrates a system diagram, according to some embodiments. The first application described above may be a third-party application 702 (e.g., Amazon Alexa®), which may be linked to an SDK 704 that is linked in at compile time. The SDK 704 may include a core, app clusters, and data models for use with the multi-ecosystem protocol that communicates with each of the smart home devices. A universal setup utility 706 may handle pairing operations for multi-admin APIs and may utilize built-in proprietary set up flows that are retrieved from external sources as described in the commonly assigned U.S. patent application Ser. No. 17/838,736.

As described briefly above, the universal set up utility 706 may handle the setup, commissioning, registration, and/or provisioning of smart home devices as they are added to an ecosystem and paired with a specific application or user account. The pairing API may provide functions that can be called by the third-party application 702 to perform the setup activities. The multi-admin API may provide functions that allow devices to be shared between applications and/or control devices as described above. The universal set up utility 706 may also include the SDK 704 to perform the communication, setup, and pairing activities with the devices. However, these functions need not be exposed to the third-party application 702, as the universal setup utility 706 may handle this communication entirely.

Figure 8:
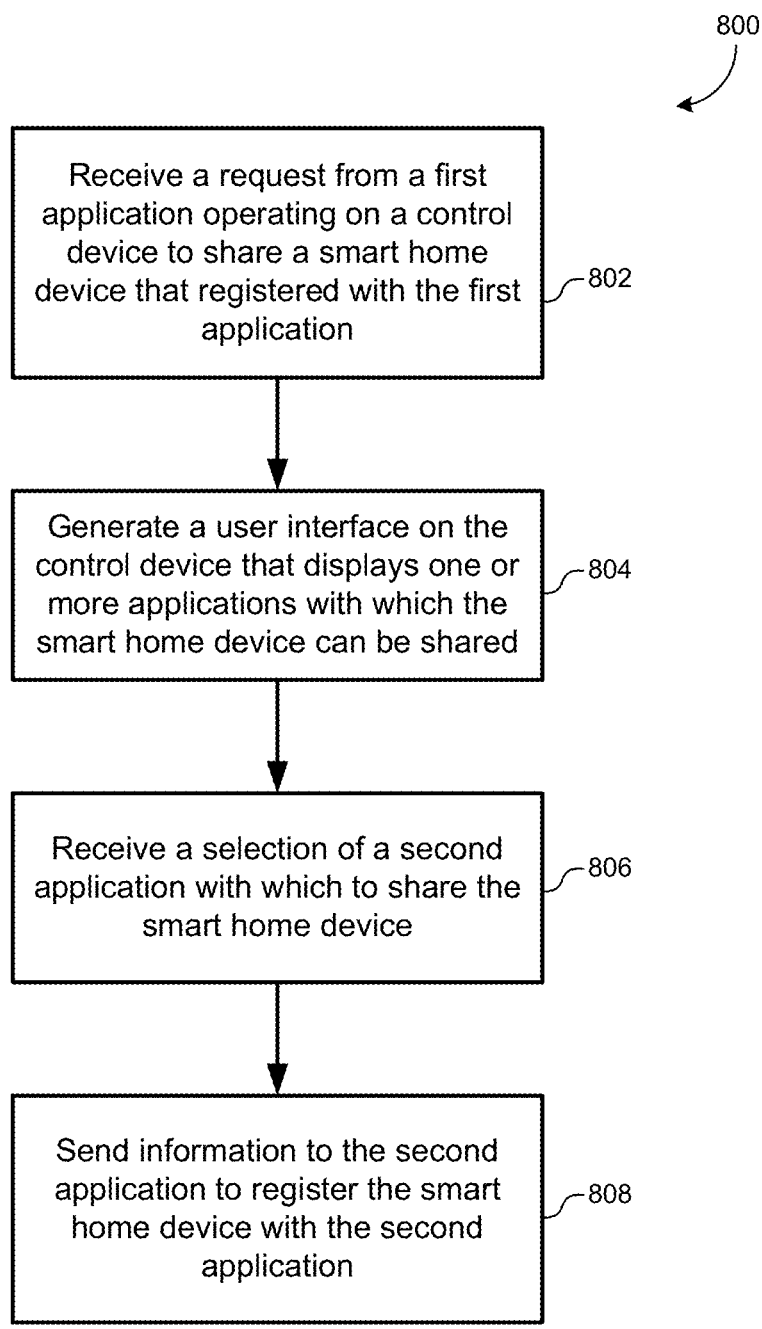
FIG. 8 illustrates a flowchart 800 of a method for sharing smart home devices between applications, according to some embodiments.

FIG. 8 illustrates a flowchart 800 of a method for sharing smart home devices between applications, according to some embodiments. This method may be executed by an operating system of the control device, such as the Google Android® operating system. For example, this method may be executed by one or more processors on the control device. Instructions to execute this method may be stored on a non-transitory computer-readable medium that, when executed by the one or more processors, cause the one or more processors to perform the operations described below as an application or operating system utility.

The method may include receiving a request from a first application operating on a control device to share a smart home device that is registered with the first application (802). The control device may include any computing device (e.g., a smart phone), and the smart home device may include any smart home device, including any of the example devices described above in FIG. 1, such as a thermostat, a hazard detector, a component of a security system, a smart doorbell, a video camera, a child monitor, a smart appliance, an audio speaker, and so forth. This request may include a request to share a specific smart home device, or may include a request to share any of a plurality of smart devices registered with the first application.

The method may also include generating a user interface on the control device that displays one or more applications with which the smart home device can be shared (804). The user interface may include a modified or augmented share sheet as described above. The user interface may display icons representing the smart home device, a plurality of smart home devices registered with the first application, and the one or more applications with which the smart home device can be shared. The one or more applications with which the smart home device can be shared may have been previously registered with the operating system. Alternatively, the operating system may identify the one or more applications by virtue of metadata or other tags that indicate that those applications are compatible with the smart home device or smart home devices of a particular type.

The method may additionally include receiving a selection of a second application with which to share the smart home device (806). The second application may be selected from the one or more applications with which the device is compatible. The selection may be made by tapping the user interface or otherwise selecting the application from the one or more applications in the user interface.

The method may further include sending information to the second application to register the smart home device with the second application (808). For example, user interface may generate a QR code to be scanned by the second application when the second application operates on a second control device that is separate and distinct from the first control device. The QR code may include information for registering the smart home device with the second application, such as a pairing code. Alternatively, a pairing code may be passed from the first application to the second application using a secure communication utility of the operating system of the control device. In some embodiments, the first application may place the smart home device in a multi-admin mode such as the first application and the second application can both administer the smart home device. The second application may setup the smart home device using a multi-ecosystem protocol and a universal setup utility that is part of the operating system of the control device as described above. For example, the first application may be part of a first smart home ecosystem, the second application may be part of a second smart home ecosystem, and smart home device may be part of a third smart home ecosystem.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of sharing smart home devices between applications, the method comprising:
   receiving, by an operating system of a control device, a request from a first application operating on the control device to share a smart home device that is registered with the first application;
   generating, by the operating system, in a user interface on the control device, an augmented share sheet that displays one or more applications that are also operating on the control device with which the smart home device can be shared, wherein the smart home device is unregistered for use with the one or more applications;
   receiving, by the operating system, a selection of a second application from among the one or more applications with which to share the smart home device; and
   sending information from the first application to the second application to register the smart home device with the second application.

2. The method of claim 1, wherein the control device comprises a smart phone.

3. The method of claim 1, wherein the smart home device comprises a thermostat, a hazard detector, a component of security system, a smart doorbell, a video camera, a child monitor, a smart appliance, or an audio speaker.

4. The method of claim 1, wherein the second application is operating on the control device with the first application.

5. The method of claim 1, wherein the second application is operating on a second control device.

6. The method of claim 5, wherein sending the information to the second application comprises generating a QR code in the user interface to be scanned by the second control device, wherein the QR code comprises information for registering the smart home device with the second application.

7. A non-transitory computer-readable medium comprising instructions that, when executed by one or more processors, cause the one or more processors to perform operations comprising:
receiving, by an operating system of a control device, a request from a first application operating on the control device to share a smart home device that is registered with the first application;
generating, by the operating system, in a user interface on the control device, an augmented share sheet that displays one or more applications that are also operating on the control device with which the smart home device can be shared, wherein the smart home device is unregistered for use with the one or more applications;
receiving, by the operating system, a selection of a second application from among the one or more applications with which to share the smart home device; and
sending information from the first application to the second application to register the smart home device with the second application.

8. The non-transitory computer-readable medium of claim 7, wherein receiving the request from the first application comprises a command to share any of a plurality of smart home devices registered with the first application.

9. The non-transitory computer-readable medium of claim 8, wherein the operations further comprise selecting the smart home device from the plurality of smart home devices registered with the first application using the user interface.

10. The non-transitory computer-readable medium of claim 7, wherein the operations further comprise sending a request to an operating system of the control device to return a list of the one or more applications with which the smart home device can be shared.

11. The non-transitory computer-readable medium of claim 7, wherein the operations further comprise accessing, by the operating system, metadata of the applications that indicates that the one or more applications are compatible with the smart home device.

12. The non-transitory computer-readable medium of claim 7, wherein sending the information to the second application comprises the operating system sending the information via a secure communication utility of the operating system.

13. The non-transitory computer-readable medium of claim 7, wherein the second application uses a universal setup utility of the operating system to register the smart home device with the second application using a multi-ecosystem protocol.

14. A control device comprising:
one or more processors; and
one or more memory devices comprising instructions that, when executed by the one or more processors, cause the one or more processors to perform operations comprising:
receiving, by an operating system of the control device, a request from a first application operating on the control device to share a smart home device that is registered with the first application;
generating, by the operating system, in a user interface on the control device, an augmented share sheet that displays one or more applications that are also operating on the control device with which the smart home device can be shared, wherein the smart home device is unregistered for use with the one or more applications;
receiving, by the operating system, a selection of a second application from among the one or more applications with which to share the smart home device; and
sending information from the first application to the second application to register the smart home device with the second application.

15. The control device of claim 14, wherein the first application places the smart home device in a multi-admin mode such that the first application and the second application can both administer the smart home device.

16. The control device of claim 14, wherein sending the information to the second application comprises generating a pairing code and passing the pairing code to the second application.

17. The control device of claim 16, wherein the pairing code is embedded in a QR code generated in the user interface.

18. The control device of claim 14, wherein the first application is from a first smart home ecosystem, and the second application is from a second smart home ecosystem.

19. The control device of claim 18, wherein the smart home device is from a third smart home ecosystem.

* * * * *